United States Patent [19]

Maeda et al.

[11] Patent Number: 5,699,336
[45] Date of Patent: Dec. 16, 1997

[54] REPRODUCING APPARATUS HAVING BUFFER MEMORY AND CAPABLE OF RAPIDLY RESTARTING REPRODUCTION AND METHOD OF CONTROLLING THE APPARATUS

[75] Inventors: Yasuaki Maeda, Kanagawa; Hideki Nagashima; Kosuke Nakamura, both of Tokyo, all of Japan

[73] Assignee: Sony Corporation, Tokyo, Japan

[21] Appl. No.: 588,543

[22] Filed: Jan. 18, 1996

[30] Foreign Application Priority Data

Jan. 25, 1995 [JP] Japan .................. P7-027729

[51] Int. Cl.6 ........................................ G11B 5/09
[52] U.S. Cl. ........................................ 369/54; 369/32
[58] Field of Search ..................... 369/32, 44.27, 369/44.28, 54, 58, 60, 47, 48, 50

[56] References Cited

U.S. PATENT DOCUMENTS

| | | | |
|---|---|---|---|
| 4,495,609 | 1/1985 | Russell . | |
| 4,530,073 | 7/1985 | Higashihara et al. | 369/50 |
| 4,536,864 | 8/1985 | Van Rosmalen . | |
| 4,796,123 | 1/1989 | Takeuchi et al. | 360/10.1 |
| 4,796,247 | 1/1989 | Vogelsang . | |
| 4,837,626 | 6/1989 | Nishiyama et al. | 358/183 |
| 4,982,390 | 1/1991 | Tanaka | 369/30 |
| 4,984,103 | 1/1991 | Nigam | 360/74.1 |
| 5,014,136 | 5/1991 | Sakai et al. | 358/341 |
| 5,032,930 | 7/1991 | Suetaka et al. | 358/342 |
| 5,034,827 | 7/1991 | Fukatsu et al. | 360/10.3 |
| 5,042,019 | 8/1991 | Kitai et al. | 369/32 |
| 5,070,419 | 12/1991 | Kiyonaga | 360/72.2 |
| 5,140,571 | 8/1992 | Nishida et al. | 369/44.11 |
| 5,212,678 | 5/1993 | Roth et al. | 369/60 |
| 5,214,631 | 5/1993 | Maeda et al. | 369/59 |
| 5,224,087 | 6/1993 | Maeda et al. | 369/54 |
| 5,224,089 | 6/1993 | Matsumura et al. | 369/124 |
| 5,243,587 | 9/1993 | Itoh et al. | 369/48 |
| 5,243,588 | 9/1993 | Maeda et al. | 369/54 |
| 5,289,440 | 2/1994 | Bakx | 369/32 |
| 5,291,467 | 3/1994 | Ishiwata et al. | 369/44.28 |
| 5,317,553 | 5/1994 | Ohga et al. | 369/54 |
| 5,418,762 | 5/1995 | Kitayama | 369/13 |
| 5,440,529 | 8/1995 | Takezawa et al. | 369/13 |
| 5,442,608 | 8/1995 | Umeda et al. | 369/44.27 |
| 5,502,700 | 3/1996 | Shinada | 369/50 |

FOREIGN PATENT DOCUMENTS

| | | | |
|---|---|---|---|
| 82643/91 | 2/1992 | Australia | G11B 20/10 |
| 0138246 A2 | 4/1985 | European Pat. Off. | G11B 20/10 |

(List continued on next page.)

OTHER PUBLICATIONS

Patent Abstracts of Japan, vol. 16, No. 139 (P-1334), Victor Co. of Japan Ltd., JP 3-296927, Dec. 12, 1991, INV: Shigeru Nemoto.

Patent Abstracts of Japan, vol. 17, No. 438 (P-1591), Pioneer Electronic Corp., JP 5-089469, Apr. 9, 1993, INV: Eiji Muramatsu.

Patent Abstracts of Japan, vol. 13, No. 353, p. 199, JP 1-112573, Published May 1, 1989, INV: Junichi Kondo.

Sony Mini Disc System Technical Manual, Mar. 1992, Sony Corporation Audio Development Group, Tokyo, Japan.

*Primary Examiner*—P. W. Huber
*Attorney, Agent, or Firm*—Limbach & Limbach L.L.P.

[57] ABSTRACT

A reproducing apparatus in which a reproduction signal reproduced from a recording medium is temporarily stored in a memory and is thereafter read out, and in which, when the amount of accumulation of the reproduction signal stored in the memory becomes equal to or larger than a predetermined value, a function of at least one section of the reproducing apparatus is inhibited. A part of at least one of a program read out from the memory before the inhibition of the above-mentioned function and other programs before and after the program read out from the memory is previously stored in the memory. Therefore, even if an access to such a program is requested while the function of the related section of the reproducing apparatus is inhibited, the part of the program can be read out to immediately obtain the desired reproduction output.

18 Claims, 8 Drawing Sheets

FOREIGN PATENT DOCUMENTS

| | | | |
|---|---|---|---|
| 0155970 A1 | 10/1985 | European Pat. Off. | G11B 5/09 |
| 0196590 A3 | 10/1986 | European Pat. Off. | G11B 11/10 |
| 0249781 A3 | 12/1987 | European Pat. Off. | G11B 7/09 |
| 0283727 A2 | 9/1988 | European Pat. Off. | G11B 20/10 |
| 0367094 A2 | 5/1990 | European Pat. Off. | G11B 7/085 |
| 0420211 A3 | 4/1991 | European Pat. Off. | G11B 20/18 |
| 0429139 A1 | 5/1991 | European Pat. Off. | G11B 7/00 |
| 0465053 A3 | 1/1992 | European Pat. Off. | G11B 20/10 |
| 0485234 A2 | 5/1992 | European Pat. Off. | G11B 20/10 |
| 2317726 | 7/1975 | France | G11B 5/00 |
| 1560494 | 2/1980 | United Kingdom | G11B 25/04 |
| 2136192 | 9/1984 | United Kingdom | G11B 7/00 |
| 2258372 | 3/1993 | United Kingdom | G11B 20/10 |

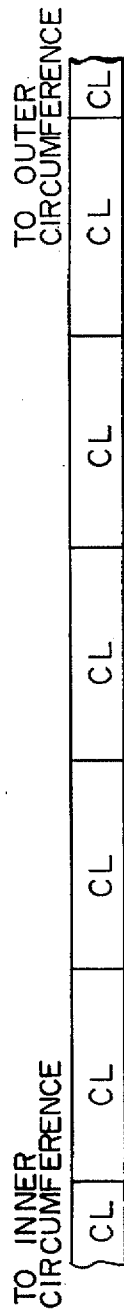
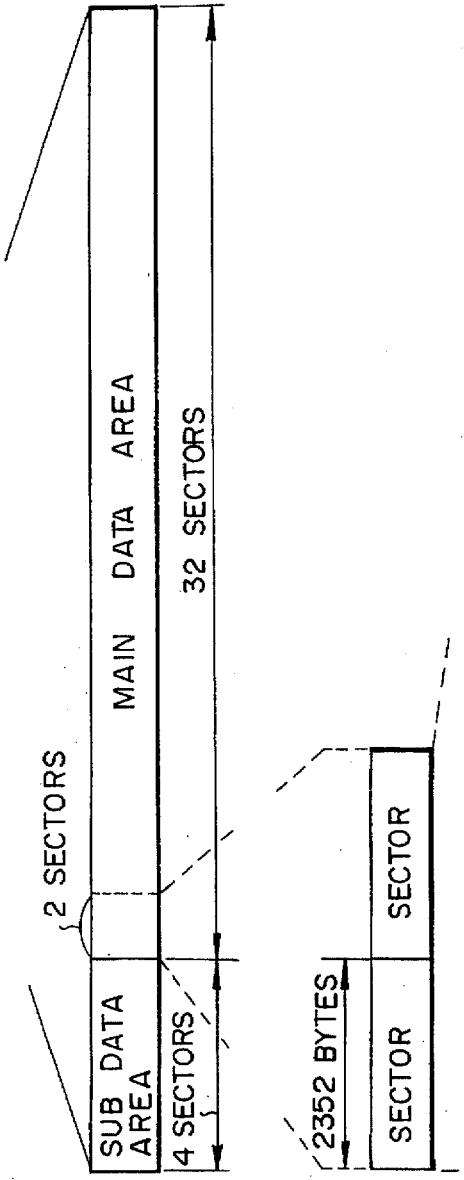
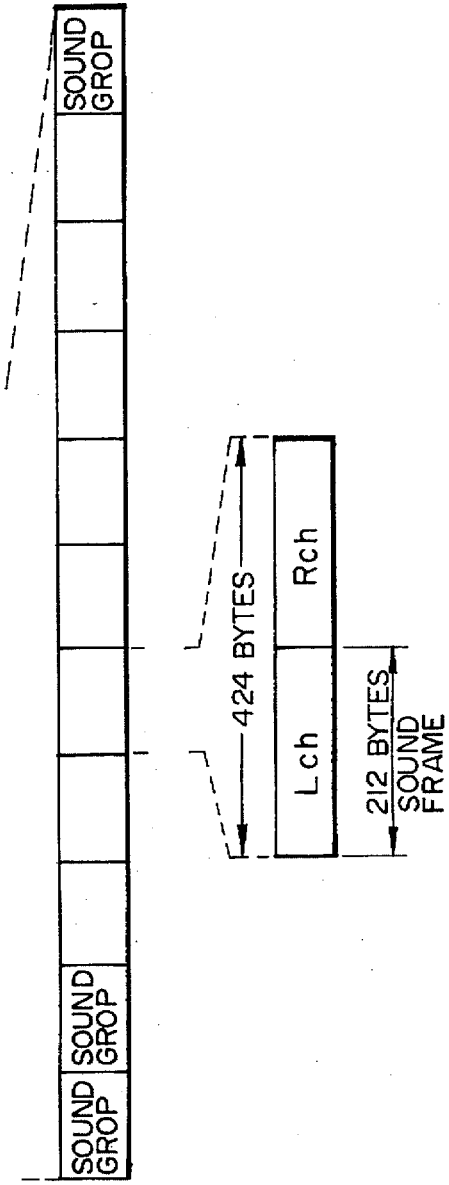
FIG. 4A  FIG. 4B  FIG. 4C  FIG. 4D  FIG. 4E

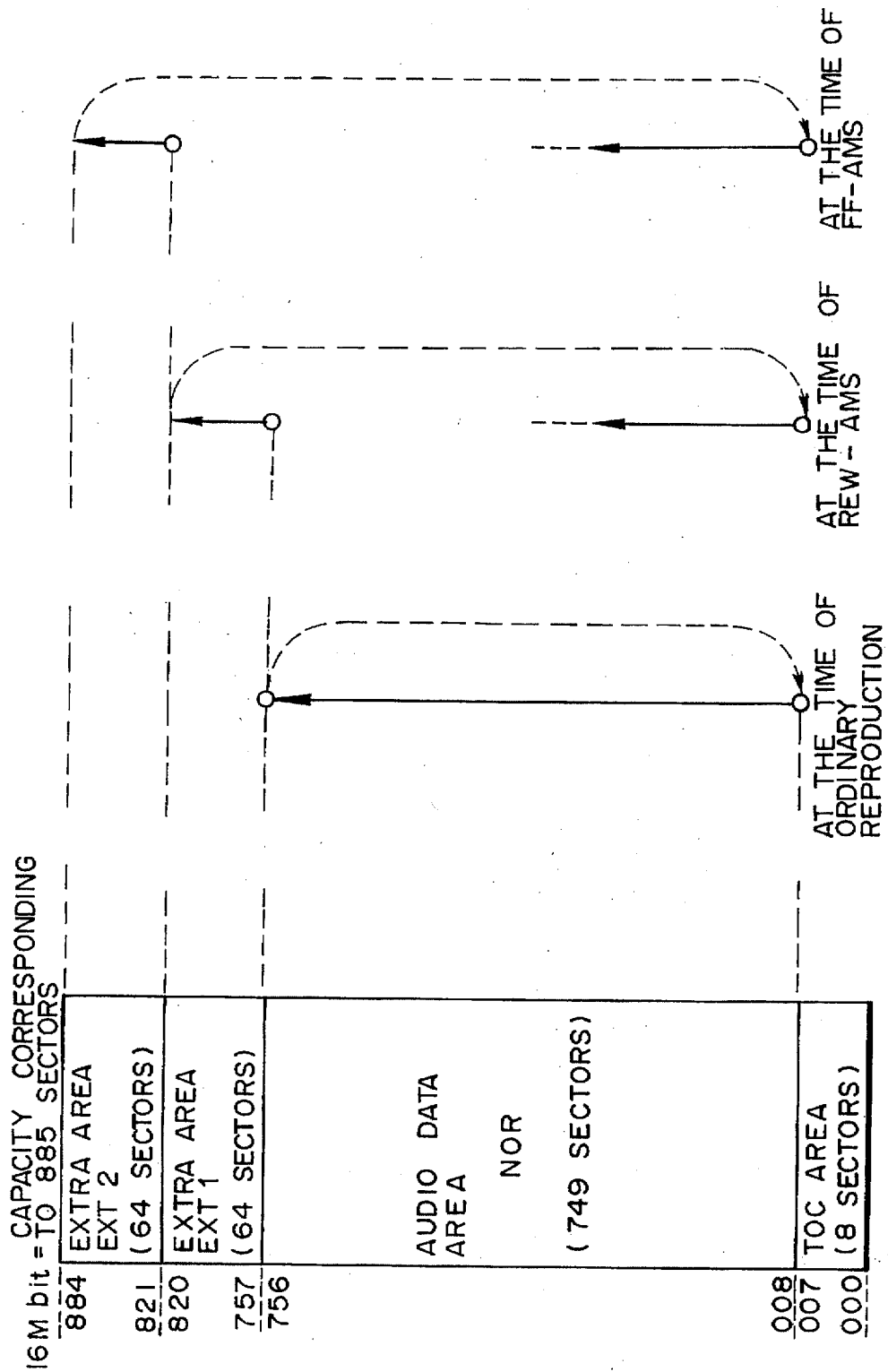

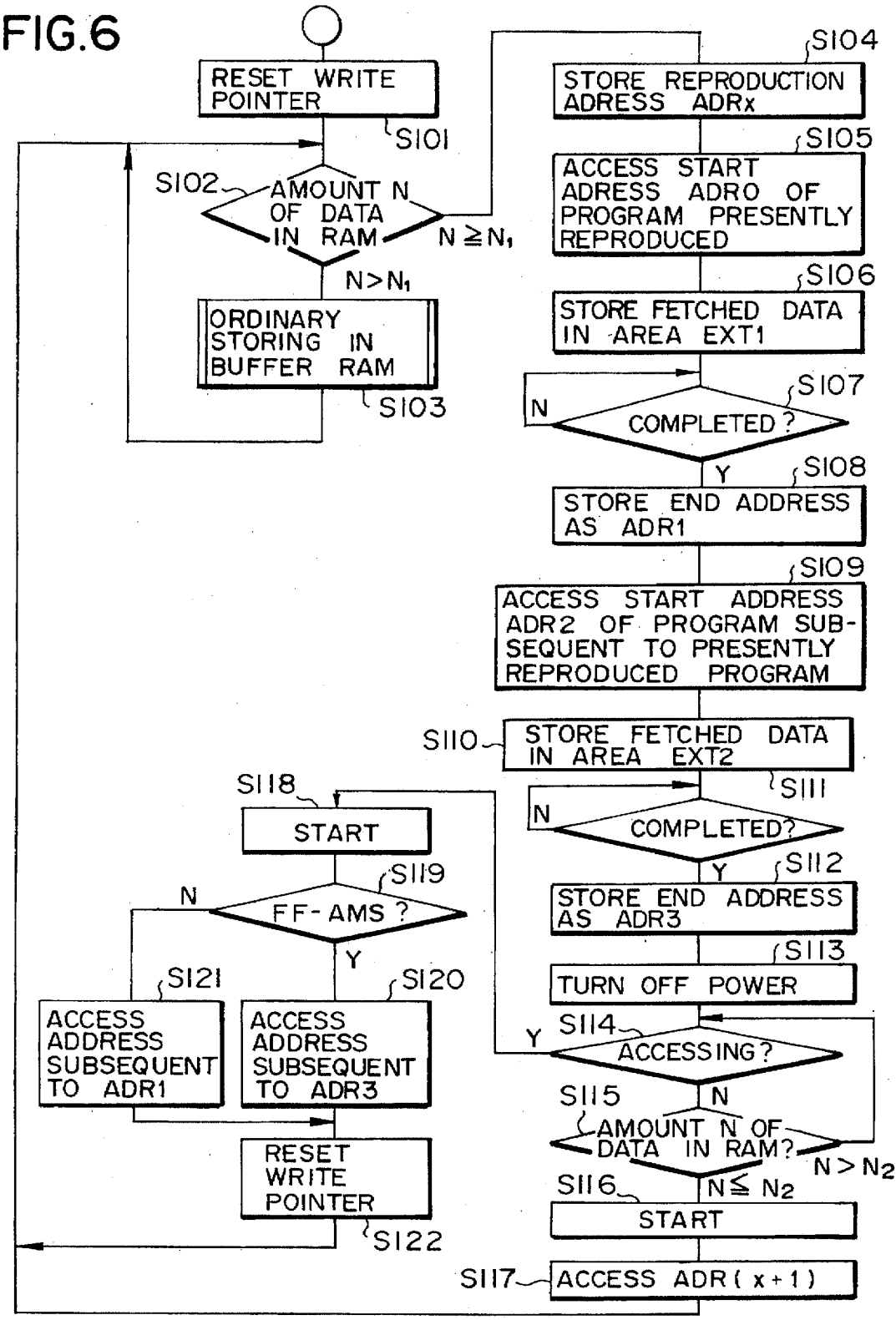

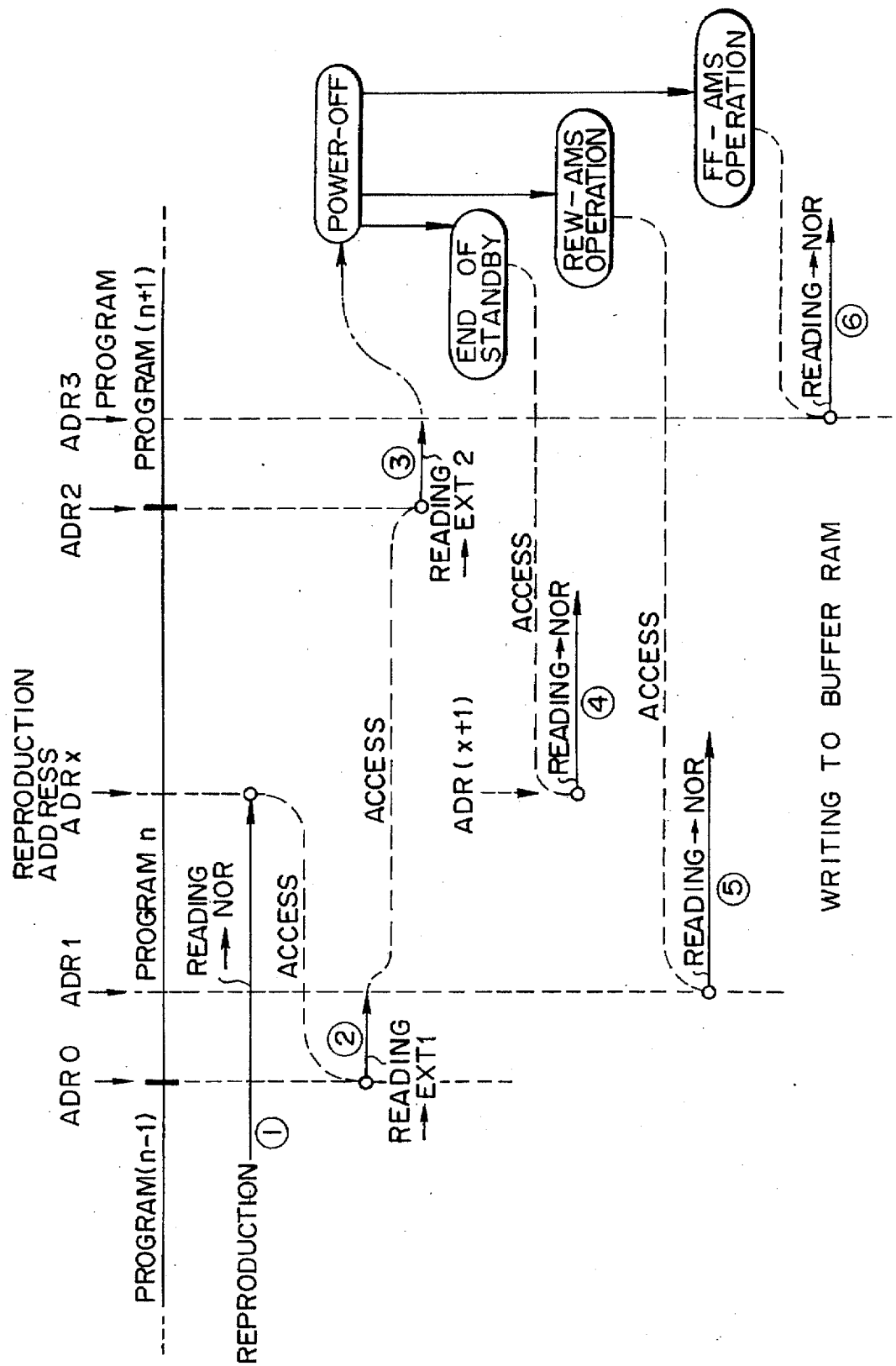

REPRODUCING APPARATUS HAVING BUFFER MEMORY AND CAPABLE OF RAPIDLY RESTARTING REPRODUCTION AND METHOD OF CONTROLLING THE APPARATUS

BACKGROUND OF THE INVENTION

1. Field of the Invention

The present invention relates to a reproducing apparatus capable of reproducing data, for example, from a disc-like recording medium.

2. Description of the Related Art

There is a demand for minimizing power consumption, for example, in a reproducing apparatus using a magneto-optical disc or an optical disc, Such demand is particularly strong with respect to smaller portable apparatuses using power supplied from an internal battery.

A reproducing apparatus is known which uses a magneto-optical disc as a recording medium and in which data read out from the recording medium by an optical head is temporarily stored in a buffer memory, then read out from the buffer memory by a predetermined timing and converted into a reproduced audio signal to be output, as disclosed in U.S. Pat. No. 5,214,631, for example.

The transfer rate at which data read out by the optical head is supplied to the buffer memory is set so as to be higher than the transfer rate at which data is read out from the buffer memory. That is, writing data to the buffer memory is performed at a higher rate in comparison with reading out data from the buffer memory, so that some part of data read by the optical head and accumulated in the buffer memory always remains in the buffer memory during reproducing operation even through data is continuously read out from the buffer memory. The reproducing apparatus is thus arranged to output the reproduced signal without interruption even when a track jump due to a disturbance, for example, temporarily disables the apparatus from performing the operation of reading data from the recording medium by the optical head, i.e. reproduction from the disc.

In this kind of reproducing apparatus, the operations of the optical head and the signal system from the optical head to the buffer memory are performed intermittently so that the amount of data supplied to the buffer memory does not exceed the amount of space in the buffer memory even if the data is written to the buffer memory at a high rate. Actually, during the period when no data is supplied to the buffer memory, the optical head is controlled so as to pause on standby till the time of next data reading.

During the period when the optical head does not read out data from the disc, the optical head, the servo system and the demodulation system before the buffer memory may be turned off to stop operating instead of being maintained in such a pausing standby state. Considering the reduction in power consumption as mentioned above, it is preferable to execute power saving processing by cutting the power supply to the optical head, the servo system and the demodulation system before the buffer memory or by stopping the operating clock. For example, an art using such a power saving technique, related to the present invention is disclosed in U.S. Pat. No. 5,502,700 issued Mar. 26, 1996.

If an energy saving mode is provided to execute energy saving processing of the optical head, the servo system and the demodulation system before the buffer memory according to the storage capacity of the buffer memory as described above, a problem described below is encountered.

In the energy saving mode, that is, when the power supply to the optical head, the servo system and the demodulation system is turned off, the operation of gaining access to the next track head position (Automatic Music Scan (AMS) access) or the like may be started. In such a situation, it is impossible to perform rapid accessing by restarting the circuit system from the power-off state.

This is because, actually, in the mode of maintaining the drive system or the signal processing system in the power-off state while an audio output from the memory is being formed, there is a need for the same kinds of starting processing as the ordinary processings for starting from the power-supply-off state, i.e., spindle rotation processing, phase locked loop processing (PLL), focus search processing, focus servo-on processing, tracking-on processing and the like. When the accessing operation is started, such starting processings are first performed and the optical head is then enabled to actually perform accessing. As a result, a user operating the apparatus feels that the time period from the time when an accessing instruction is input to the time when data read out from the disc is output as audio data through the buffer memory is long.

SUMMARY OF THE INVENTION

In view of this problem, an object of the present invention is to provide an apparatus capable of rapidly obtaining a reproduction output by an accessing operation even if the accessing operation is started when the apparatus is operating in the power saving mode.

To achieve this object, according to one aspect of the present invention, there is provided a reproducing apparatus having: a reproducing head for reproducing information recorded on a recording medium; a memory for temporarily storing a reproduction signal reproduced from the recording medium; a first controller for controlling the memory so that the reproduction signal reproduced by the reproducing head is written at a first rate to the memory and is read out from the memory at a second rate lower than the first rate, and so that writing the reproduction signal to the memory is stopped when the amount of accumulation of the reproduction signal in the memory becomes equal to or greater than a predetermined value; a second controller for power saving by stopping an operation of a circuit relating to the reproducing operation; and a third controller for performing movement control for moving the reproducing head to a position corresponding to one of a program in the reproduction signal stored in the memory and other programs before and after the reproduction signal while writing the reproduction signal is stopped, for controlling the first controller so that at least a part of the program corresponding to the position to which the reproducing head has been moved is reproduced after the movement of the reproducing head, and so that the reproduction signal obtained by the program reproduction is stored at the first rate in the memory, and for controlling the power saving controller to stop a circuit relating to the reproducing operation only after the part of the program has been stored in the memory.

According to another aspect of the present invention, there is provided a control method in which a reproduction signal reproduced from a recording medium is written at a first rate to storage means and is read out from the storage means at a second rate lower than the first rate, and in which, when the amount of accumulation of the reproduction signal in the storage means becomes equal to or greater than a predetermined value, reproducing from the recording medium and an operation of at least one section relating to the operation of reproducing from the recording medium are stopped. This control method includes the steps of: moving reproducing means to a position corresponding to one of the program finally stored in the storage means and other programs before and after the finally-stored program; reproducing, by the reproducing means, at least a part of the program corresponding to the position to which the reproducing means has been moved and writing the reproduction signal obtained by the program reproduction to the storage means; and stopping the operation of the section relating to the reproducing operation after the completion of the step of writing to the storage means.

The power-saving control means arranged as described above is provided to achieve a reduction in power consumption and an increase in the life of a battery.

Further, considering the possibility of a program-search accessing operation being started during a time period when power consumption reducing processing is being performed by cutting the power supply to a predetermined section, an extra area is provided to store data to be reproduced and output when such an accessing operation is performed. The data stored therein is first read out when the accessing operation is performed, whereby the data from the accessed point can be immediately reproduced and output. That is, at least an amount of data corresponding to the time period necessary for starting processing is stored in the extra area to enable the reproduction output immediately after the start of the operation. Data subsequent to the data first read out can be read out from the recording medium to obtain the desired reproduction output.

BRIEF DESCRIPTION OF THE DRAWINGS

FIG. 4A is a schematic diagram of the structure of data recorded on an magneto-optical disc;

FIG. 4B is a schematic diagram of the structure of one data cluster in the data shown in FIG. 4A;

FIG. 4C is a schematic diagram of the sector structure of main data shown in FIG. 4;

FIG. 4D is a schematic diagram of sound groups corresponding to the two sectors shown in FIG. 4C;

FIG. 4E is a schematic diagram of sound frames;

FIG. 5A is a schematic diagram of data allocation in the buffer RAM;

FIG. 5B is a schematic diagram of the range of reading out data from the buffer RAM at the time of ordinary reproduction;

FIG. 5C is a schematic diagram of the range of reading out data from the buffer RAM at the time of forward program accessing;

FIG. 5D is a schematic diagram of the range of reading out data from the buffer RAM at the time of rearward program accessing;

FIG. 6 is a flowchart of processing for writing to buffer RAM 13;

FIG. 8 is a timing chart of processing for writing to buffer RAM 13.

DESCRIPTION OF THE PREFERRED EMBODIMENT

Figure 1:
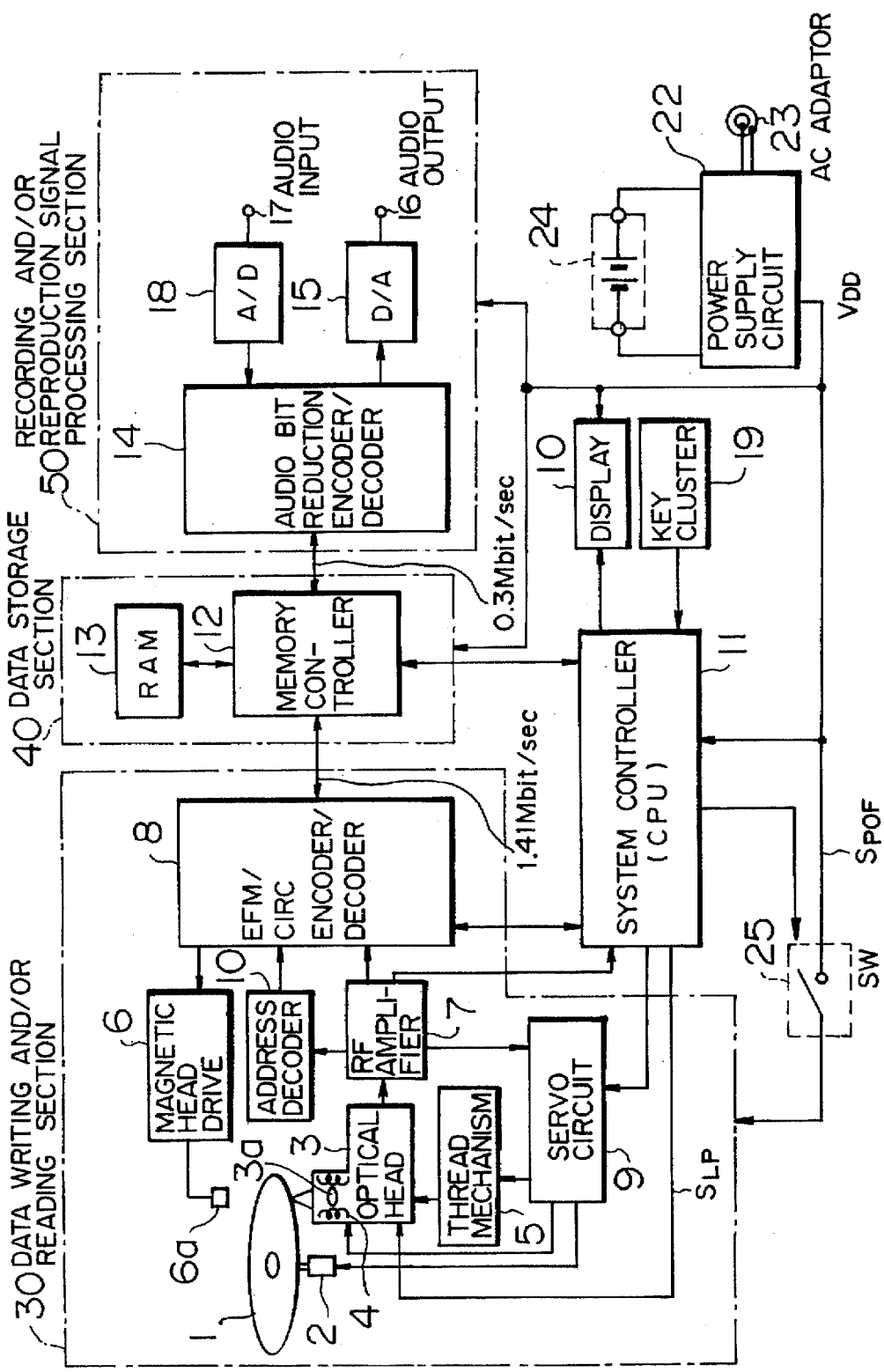
FIG. 1 is a block diagrams of an embodiment of a magneto-optical disc recording and/or reproducing apparatus in accordance with the present invention.

An embodiment of the present invention will be described below with reference to FIGS. 1 to 8. In this embodiment, the present invention is applied to a recording and reproducing apparatus using a magneto-optical disc as a recording medium. FIG. 1 shows blocks representing essential components of the recording and reproducing apparatus.

As shown in FIG. 1, this recording and reproducing apparatus has a reproduced data transfer system constituted by a data writing and/or reading section 30 for writing data to and/or reading data from the magneto-optical disc, a data storage section 40 for temporarily storing read-out data or data input to be written, and a recording and/or reproduction signal processing section 50 for performing audio bit reduction processing and processing for analog-to-digital and digital-to-analog signal conversions.

The magneto-optical disc 1 on which audio data, for example, is recorded is loaded in the data writing and/or reading section 30, and is driven by a spindle motor 2 to rotate. An optical head 3 irradiates the magneto-optical disc 1 with laser light at the time of recording and/or reproduction. The optical head 3 has a laser output at a high level for heating the recording track to the Curie temperature at the time of recording and has a laser output at a comparatively low level for detecting data from reflected light by the Kerr effect at the time of reproduction.

Accordingly, the optical head 3 has a laser diode provided as a laser output means, an optical system consisting of a polarization beam splitter, an objective 3a and so on, and a detector for detecting reflected light. The objective 3a is held by a two-axis mechanism 4 so as to be displacable in a radial direction of the disc (for tracking) in such a direction as to move toward and away from the disc (for focusing).

A magnetic head 6s for applying a magnetic field modulated with supplied data to the magneto-optical disc 1 is disposed in such a position as to face the optical head 3 with the magneto-optical disc 1 interposed therebetween. The optical head 3 and the magnetic head 6a can be moved in a radial direction of the disc by a thread mechanism 5.

Information detected by the magneto-optical disc 1 by the optical head 3 during a reproducing operation is supplied to an RF amplifier 7, which extracts a reproduction RF signal, a tracking error signal, focus error signal and groove information by processing the supplied information. The extracted reproduction RF signal is supplied to a encoder and/or decoder section 8. The tracking error signal, the focus error signal are supplied to a servo circuit 9, and the groove information (information of the pre-groove described below) is supplied to an address decoder 10. A pre-groove: the guide groove produced when recordable discs are injection-molded. Tracking control is performed using this groove. The pre-groove is also used to superpose sinusoidal waves and addresses by forming them to apply CLV (Constant Liner Velocity) servo throughout the disc area.

The servo circuit 9 generates various servo drive signals based on the tracking error signal and the focus error signal supplied as well as on a track jump instruction, an access instruction, information on detection of the rotation of the spindle motor 2 and so on from a system controller 11 constituted by a microcomputer. The servo circuit 9 thereby controls the two-axis mechanism 4 and the thread mechanism 5 to control focusing and tracking, and also controls the spindle motor 2 at a constant linear velocity.

The reproduction RF signal undergoes decoding processing, i.e., demodulation of the eight to fourteen modulation (EFM) coding and decoding from the cross interleave reed-solomon code (CIRC) or the like, in the encoder and/or decoder section 8 and is thereafter sent to the data storage section 40 to be temporarily written to a buffer RAM 13 by a memory controller 12. The system from the optical head 3 for reading data from the magneto-optical disc 1 to the buffer RAM 13, i.e., the data writing and/or reading section 30, has a reproduction data transfer rate of 1.41 Mbits/sec and transfers data intermittently.

The data written to the buffer RAM 13 is read out at such a timing as to be transferred as reproduction data at a rate of 0.3 Mbits/sec. The reproduction data is sent to the recording and/or reproduction signal processing section 50, that is, to an encoder and/or decoder section 14. The reproduction data undergoes reproduction signal processing such as decoding processing, which is the inverse of audio bit reduction processing, and is converted into an analog signal by a D/A converter 15. The converted analog signal is supplied to a predetermined amplification circuit through a terminal 16 to be obtained as a reproduction output, e.g., right-channel and left-channel audio signals.

The operation of writing data to and/or reading out data from the buffer RAM 13 at the time of reproduction will be described. Writing data to and/or reading out data from the buffer RAM 13 is performed in such a manner that the memory controller 12 designates addresses by controlling a write pointer or a read pointer.

FIGS. 2A to 2D show the conception of the operation of writing data to and/or reading out data from the buffer RAM 13. It is assumed here that addresses 0 to n are set as data areas in the buffer RAM 13.

Actually, table-of-contents (TOC) data or the like for controlling the recording and/or reproducing operation is also stored in the buffer RAM 13 along with audio data. Therefore, storage areas other than those for audio data are also set in the buffer RAM 13, and extra areas which characterize this embodiment are also provided.

Figure 2A:
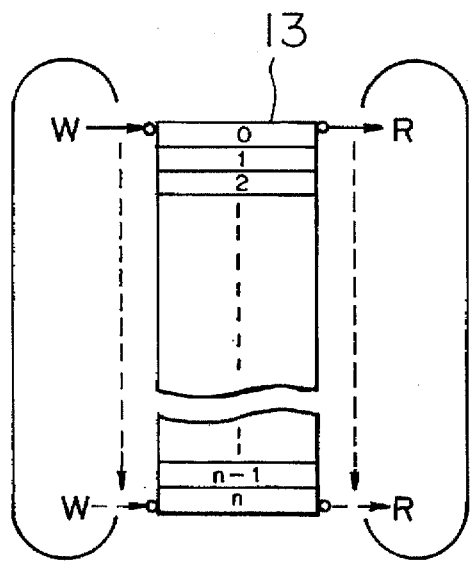
FIG. 2A is a schematic diagrams of a write pointer and a read pointer for buffer RAM 13 of the embodiment of the invention shown in FIG. 1.

As shown in FIG. 2A, the write pointer W and the read pointer R are controlled so as to be successively incremented with respect to addresses 0 to n, that is, controlled in a rind-buffer form such that the pointer is reset to address 0 after address n.

Figure 2B:
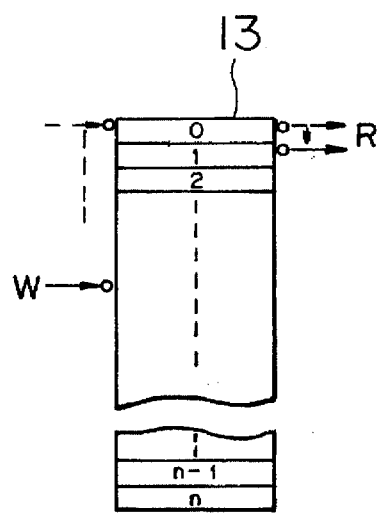
FIG. 2B is a diagram of changes of the write pointer and the read pointer shown in FIG. 2A.

While, after the start of the reproducing operation, data is being read out from the magneto-optical disc 1 by the data writing and/or reading section 30 and supplied to the data storage section 40, the write pointer W is successively incremented as shown in FIG. 2B and the data is written to the addresses according to the increment. Substantially simultaneously with this writing (or when a certain amount of written data is accumulated), the read pointer R is successively incremented to execute reading the data from each address. The data read out is supplied to the encoder and/or decoder section 14.

Figure 2C:
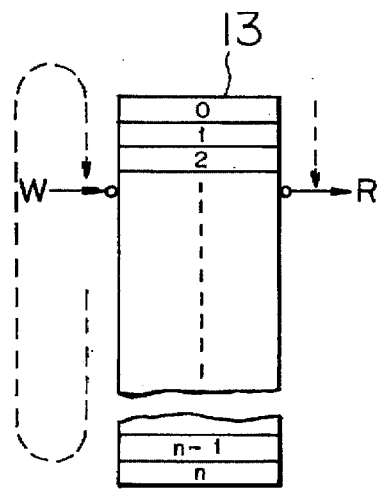
FIG. 2C is a schematic diagram showing a state of the write and read pointers shown in FIG. 2A where the address designated by the write pointer has caught up the address designated by the read pointer.

As mentioned above, the write pointer W is incremented at the timing of 1.41 Mbits/sect while the read pointer R is incremented at the timing of 0.3 Mbits/sec. Therefore, the address designated by with the write pointer W catches up the address designated by the read pointer R at a certain time, as shown in FIG. 2C. At the time when the read pointer R designates address x, the write pointer W designates address x-1. In this situation, stored data occupies the entire storage area of the buffer RAM 13.

The incrementing of the write pointer W is then stopped and the data writing and/or reading section 30 also stops reading out data from the magneto-optical disc 1. At this time, however, the reproduced audio output is not interrupted because the incrementing of the read pointer R is executed without interruption.

Figure 2D:
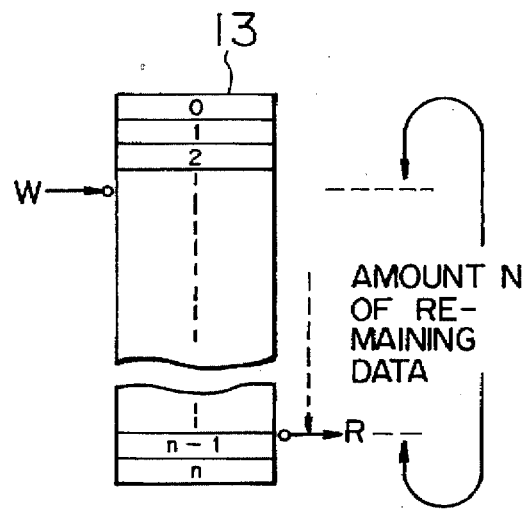
FIG. 2D is a schematic diagram showing a state of the write and read pointers shown in FIG. 2A where the increment of the write pointer has stopped and only the read pointer is controlled.

Thereafter, only the operation of reading from the buffer RAM 13 is continued and the amount N of data accumulated in the buffer RAM 13 becomes equal to or smaller than a set value at a certain time point, as shown in FIG. 2D, for example.

At that point, the data reading operation of the data writing and/or reading section 30 and the incrementing of the write pointer W are restarted and executed until the address designated by the write pointer W again catches up the address designated by read pointer R.

Thus, the operation of writing data to the buffer RAM 13 by the data writing and/or reading section 30 is performed intermittently.

Figures 3A, 3B, 3C, 3D:
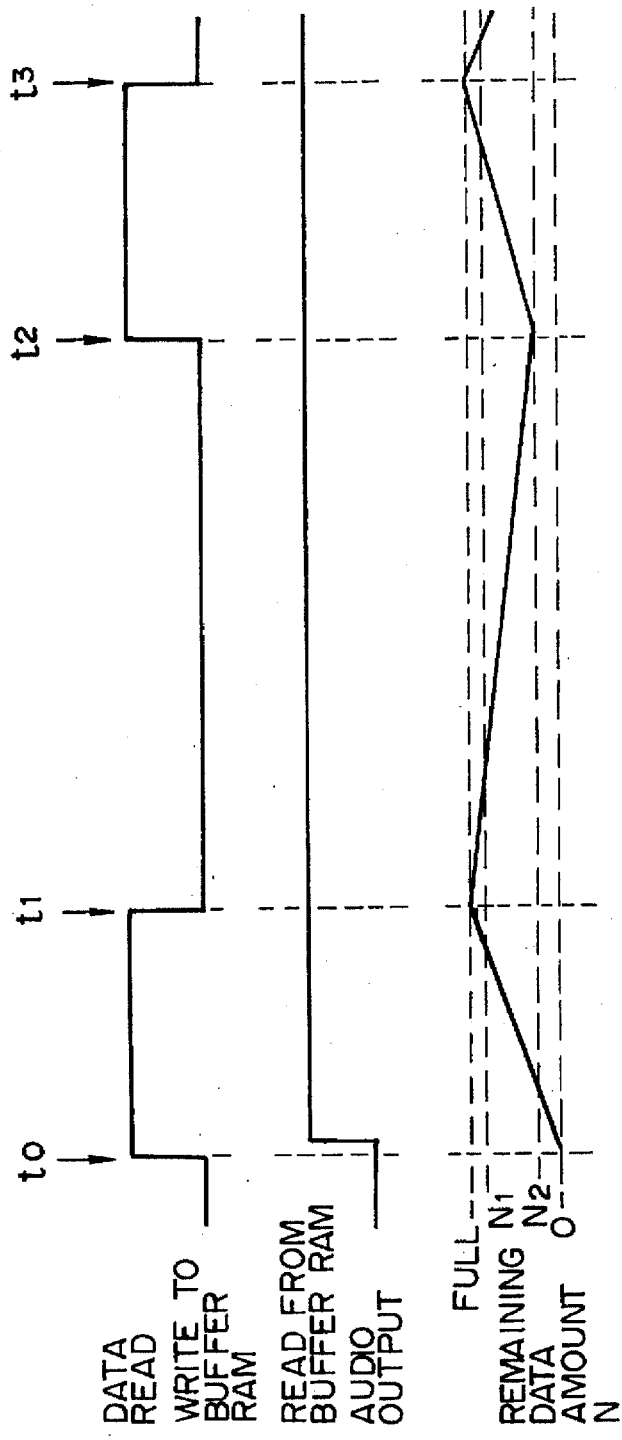
FIG. 3A is a timing chart of writing data to buffer RAM 13.
FIG. 3B is a timing chart of reading data from buffer RAM 13.
FIG. 3C is a timing chart of the amount of remaining data stored in buffer RAM 13.
FIG. 3D is a schematic diagram of the amount of data stored in buffer RAM 13.

FIGS. 3A to 3C show the timing of the above-described operation. FIG. 3D shows the amount N of data accumulated in the buffer RAM 13.

As shown in FIGS. 3A and 3B, if the reproducing operation is started at a moment $t_0$, the data writing and/or reading section 30 starts reading out data from the magneto-optical disc 1 and storing data in the buffer RAM 13. Immediately after this time, reading out data from the buffer RAM 13 and outputting the audio signal as a reproduced signal are started. At a time $t_1$, at which the amount N of accumulation of data in the buffer RAN 13 is assumed to become equal to the full-accumulation value as shown in FIG. 3C, the operation of reading out data from the magneto-optical disc 1 and the operation of storing data in the buffer RAM 13 are stopped and these operations are not started before a time $t_2$ at which the amount N of data accumulation is reduced to a value $N_2$. From the time $t_2$ to a time $t_3$ at which the full data accumulation value is again reached, the data reading operation of the data writing and/or reading section 30 and the operation of storing data in the buffer RAM 13 are executed.

The reproduction audio signal is output through the buffer RAM 13 to obtain an effect described below. For example, the reproduction audio output is not interrupted even when a tracking error occurs due to a disturbance. Before the amount of accumulated data becomes zero, the correct tracking position is reached to restart data reading, thereby enabling the operation to be continued without influencing the reproduction output. That is, the playability under the influence of a shock can be remarkably improved.

Referring again to FIG. 1, data output from the address decoder 10, i.e., address information, sub code data for control operation and the like, are supplied to the system controller 11 through the encoder and/or decoder section 8 to be used for various kinds of control operations.

A lock detection signal from the PLL circuit, for generating a bit clock for a recording and/or reproducing operation, and a monitor signal indicating the completeness of a frame sync signal of reproduction data (right or left channel) are also supplied to the system controller 11.

The system controller 11 outputs a laser control signal $S_{LP}$ for controlling the operation of the laser diode of the optical head 3. The operation of the laser diode is controlled in such a manner that the output of the laser diode is turned on and off and selectively has, when it is on, a comparatively low level at the time of reproduction and a comparatively high at the time of recording.

When the operation of recording on the magneto-optical disc 1 is executed, a recording signal (analog audio signal) supplied to a terminal 17 is converted into digital data by an A/D converter 18. This digital data is supplied to the encoder and/or decoder section 14 to undergo audio bit reduction encoding. The recording data bit-reduced by the encoder and/or decoder section 14 is temporarily written to the buffer RAM 13 by the memory controller 12 and is read out by predetermined timing to be sent to the encoder and/or decoder section 8, After being encoded by CIRC encoding and EFM or the like in the encoder and/or decoder section 8, the data is supplied to the magnetic head drive circuit 6.

The operation of the buffer RAM 13 at the time of recording is performed in such a manner that the data from the encoder and/or decoder section 14 is continuously written with the write pointer W while the read pointer R is intermittently incremented at a high rate. That is, generally speaking, the operations of the write pointer W and the read pointer R at the time of recording are reverse to those at the time of reproduction.

The magnetic head drive circuit 6 supplies the magnetic head 6a with a magnetic head drive signal according to encoded recording data. That is, a magnetic field produced by the magnetic head 6 is applied to the magneto-optical disc 1 from the N- or S-pole side. Also, at this time, the system controller 11 supplies the optical head with a control signal such that the optical head outputs laser light at the recording level.

An operating unit 19 having keys operated by a user and a display unit 20 formed of, for example, a liquid crystal display are provided. The operating unit 19 is provided with a reproduction key, a stop key, an FF-AMS key (a forward program designation key), a REW-AMS key (backward program designation key), a search key and the like, which are operated by a user. The FF-AMS key is an access operation key for program searching in the direction of increase in track number while the REW-AMS key is an access operation key for program searching in the direction of reduction in track number.

A power supply circuit 22 has a DC-DC converter or the like and has an operating power supply $V_{DD}$ for the components of the apparatus. A battery (dry battery or rechargeable battery) 24 can be used as a power source connected to the power supply circuit 22. Also, a commercial AC power can be connected through an AC adapter connected to an AC adapter terminal 23.

The data format of the disc 1 will be described.

FIGS. 4A to 4E show the format of clusters which correspond to minimum units of the recording operation of the mini-disc system. One cluster corresponds to 2 to 3 rounds of the track.

A cluster CL consists of a sub data area formed of four sectors (one sector: 2352 bytes), and a main data area formed of 32 sectors.

The four-sector sub data area is used as an area for storing sub data, a linking area and the like. TOC data, audio data and so on are recorded in the 32-sector main recording area.

An address is recorded with respect to each sector.

The sectors are further divided into sound groups; two sectors are divided into eleven sound groups. Left-channel data and right-channel data are recorded in each 424-byte sound group separately from each other. One sound group has an amount of audio data corresponding to a time period of 11.61 msec, and one cluster has an amount of data corresponding to a reproducing time of about two seconds.

The data area for left-channel or right-channel data having an amount of 212 bytes is called a sound frame.

The operation relating to a power saving mode realized by the embodiment of the invention having the configuration shown in FIG. 1 and using the above-described disc will next be described.

The basic operation when the apparatus is operated in the power saving mode is performed in such a manner that only the data writing and/or reading section 30 is turned off during a time period when reading only from the RAM 13 is performed and when there is no need to operate the data writing and/or reading section 30. A similar power saving operation is possible during recording. However, such an operation is not directly related to the gist of the present invention and, therefore, will not be described.

The data writing and/or reading section 30 does not operate during a reproducing time period from $t_1$ to $t_2$ shown in FIG. 3A.

During such a time period when the data writing and/or reading section 30 is made to await the next operating time according to the amount N of remaining data in the buffer RAM 13, the system controller 11 performs power-off control of a switch 25 by a power saving control signal $S_{POF}$.

Means for such power-off control other than the switch 25 shown in FIG. 1 are also possible. For example, a switch may be provided in each of power supply lines to all or some of the components of the data writing and/or reading section 30 to stop the power supply by being turned off. Alternatively, the supply of the operating clock to each component of the data writing and/or reading section 30 may be stopped.

Another method may be adopted in which the system controller 11 supplies an operation stop command to make the servo circuit 9 and the encoder and/or decoder section 8 stop operating.

In such a case, as the operation stop command, an instruction for reducing the level of drive signals to the power supply to the two-axis mechanism 4 of the optical head 3, the spindle motor 2 and the thread mechanism to stop the supply of power to these components is transmitted from the system controller 11 to the servo circuit 9.

Such an operation stop method may alternatively be such that the supply of drive signals to all the mechanism sections are not entirely stopped; the tracking servo and the thread servo are turned off while the focus servo is kept on. In this case, the spindle servo may be controlled so that the spindle rotates at a constant speed.

In this case, the gain of the focus servo may be reduced. If such a gain-reducing control is performed simultaneously, the dissipation current can be reduced.

According to this method, only the operation of turning on the tracking servo and the thread servo and locking the spindle servo will suffice at the time of restarting. Thus, this method achieves a further reduction in the time required for restarting in comparison with the method of stopping the power supply to each component of the data writing and/or reading section 30.

Needless to say, the method of stopping the power supply to each component of the data writing and/or reading section 30 is more advantageous in terms reducing dissipation of current.

In sum, the following are possible methods for reducing the dissipation of current:

(1) a method of stopping the power supply to each component of the data writing and/or reading section 30, (2) a method of transmitting a command to stop some or all of the servo systems of the data writing and/or reading section 30 (focus, tracking, thread and spindle servo systems), (3) a method of stopping the operating clock to each component of the data writing and/or reading section 30, and (4) a method of maintaining the focus servo of the data writing and/or reading section 30 in the on-state, performing a constant-speed-rotation control of the spindle servo, turning off the tracking and thread servos, and reducing the gain of the focus servo.

Thus, in the power saving mode, the power supplied to the data writing and/or reading section 30 is reduced intermittently, thereby achieving a remarkable power saving effect. For example, in the case where the apparatus operates using battery 24, the life of the battery can be doubled.

If an accessing operation is started when the power supply to the data writing and/or reading section 30 is off in the power saving mode, accessing with the optical head 3 cannot be performed before processing for starting the data writing and/or reading section 30 is completed, so that the time taken to obtain a reproduction output after the start of the accessing operation is long. In this embodiment, to solve this problem, the apparatus is arranged so that a reproduction output can be obtained immediately after the start of an accessing operation.

FIG. 5A shows the area configuration of the buffer RAM 13 of this embodiment.

It is assumed here that the buffer RAM 13 has a storage capacity of 16 Mbits corresponding to 885 sectors represented by those shown in FIG. 4C.

In this buffer RAM, an area corresponding to 8 sectors in these sectors is used to store TOC information while an area corresponding to 749 sectors (corresponding to an amount of reproduction of audio data for about 50 seconds) is used as an audio data area NOR. This audio data area NOR is used as an area for the data buffering operation described above with reference to FIGS. 2A to 2D, and FIG. 3D. Ordinarily, using these areas, writing and/or reading is performed by controlling the write pointer W and the read pointer R as described above.

The buffer RAM 13 is further provided with extra areas EXT1 and EXT2 each corresponding to 64 sectors (corresponding to an amount of reproduction of audio data for about 4 seconds).

Needless to say, other capacity distributions between the above-described areas are also possible. However, it is preferred that the amount of data stored in each of the extra areas EXT1 and EXT2 is equal to or larger than the amount necessary for the restarting operation.

In the extra areas EXT1 and EXT2, data is stored which is first required when an AMS accessing operation is started during a time period when the power supply to the data writing and/or reading section 30 is off. That is, when data is presently being reproduced from an nth program and when the data writing and/or reading section 30 is off, an amount of data at the head of the nth program corresponding to about four seconds is stored in the extra area EXT1 to prepare for a situation where the REW-AMS key is operated while an amount of data at the head of an (N+1)th program corresponding to about four seconds is stored in the extra area EXT2 to prepare for a situation where the FF-AMS key is operated.

If the REW-AMS key is pressed when the power supply to the data writing and/or reading section 30 is off, then the data in the extra area EXT1 is read out from the buffer RAM 13 while processing for starting the data writing and/or reading section 30 is performed to read data following the data in the extra area EXT1 from the disc 1 and to store the read-out data in the audio data area NOR. After the data in the extra area EXT1 has been entirely read out, the data subsequent to it, i.e., the data stored in the audio data area NOR, is read out to continue the reproduction.

If the FF-AMS key is pressed when the power supply to the data writing and/or reading section 30 is off, then the data in the extra area EXT2 is read out from the buffer RAM 13 while processing for starting the data writing and/or reading section 30 is performed to read data following the data in the extra area EXT2 from the disc 1 and to store the read-out data in the audio data area NOR. After the data in the extra area EXT2 has been entirely read out, the data subsequent to it, i.e., the data stored in the audio data area NOR, is read out to continue the reproduction.

Figure 7:
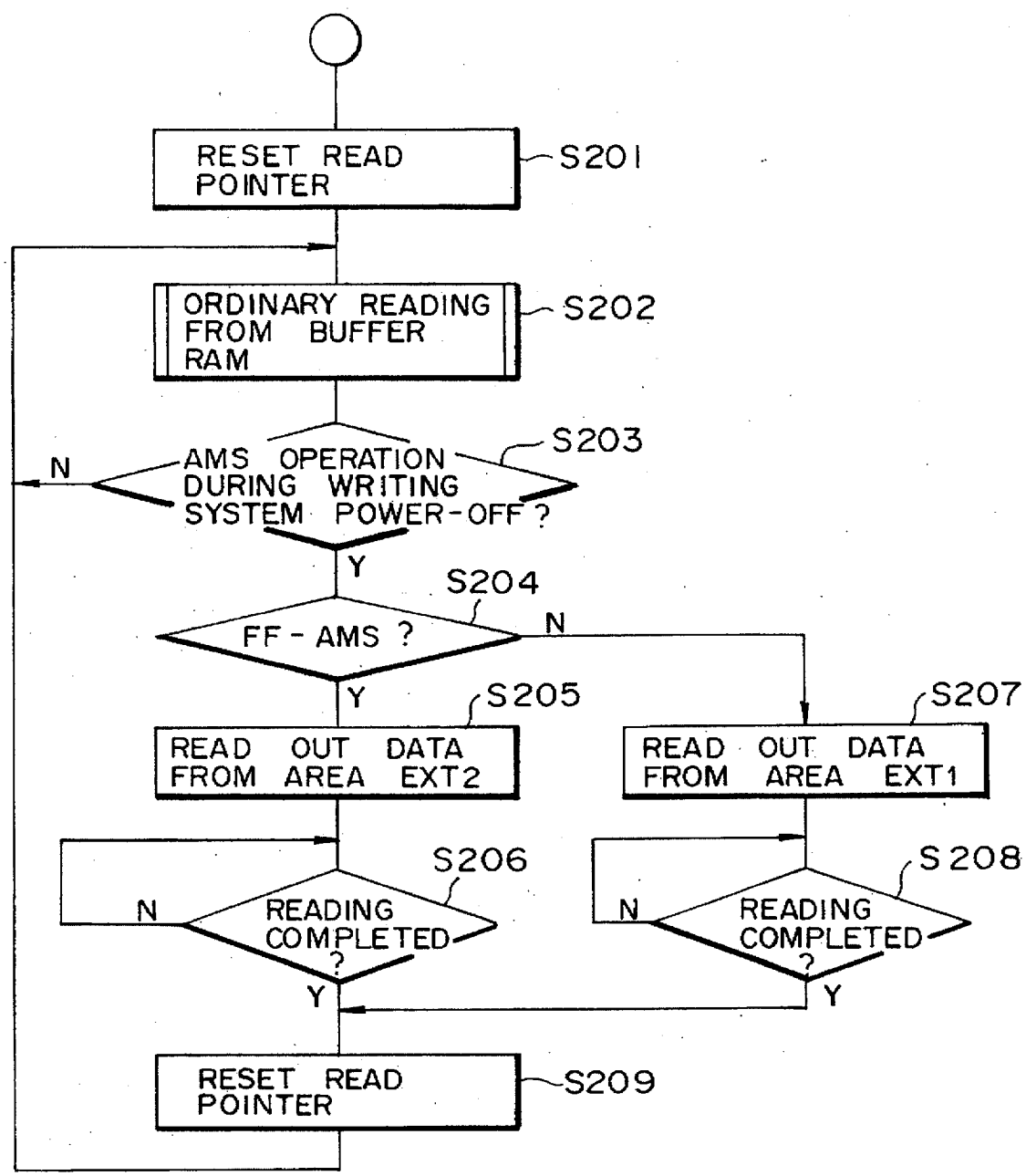
FIG. 7 is a flowchart of processing for reading from buffer RAM 13.

The above-described operation will be described in further detail. FIG. 6 is a flowchart showing control processing of the system controller 11 with respect to the operation of writing, to the buffer RAM 13, data read out from the disc 1, and FIG. 8 is a schematic diagram of this operation. FIG. 7 is a flow chart also showing control processing of the system controller 11 with respect to the operation of reading out data from the buffer RAM 13 to obtain a reproduction output, and FIGS. 5A to 5D are schematic diagrams of this operation.

Processing of the system controller 11 will first be described with reference to FIGS. 6 and 7. The writing processing shown in FIG. 6 and the reading processing shown in FIG. 7 are performed in parallel with each other.

When reproduction is started, the system controller 11 (memory controller 12) first resets the write pointer W and the read pointer R and then writes data read out from the disc 1 to the audio data area NOR of the buffer RAM 13 with respect to the sector units while incrementing the write pointer W at a high rate. Also, the system controller 11 reads out the data from the audio data area NOR while incrementing the read pointer R at a low rate. These operations are the ordinary operations of writing data to the buffer RAM 13 and reading out data from the buffer RAM 13, which are represented by Steps S103 and S202 of FIGS. 6 and 7, respectively, i.e., the operations described above with reference to FIGS. 2A to 2D.

The operation of reading from the buffer RAM 13, represented by Step S202 is successively performed to obtain an audio output. However, the operation of writing to the buffer RAM 13 is stopped according to the amount N of data accumulated in the audio data area NOR of the buffer RAM 13. That is, the accumulation amount N is monitored in Step S102 and, if N≧N₁ (see FIGS. 3C and 3D), the operation of the data writing and/or reading section 30 in the waiting time period starts, and processing for turning off the power supply to the data writing and/or reading section 30 is then started.

The address (reproduction address ADRx) of the data finally read out from the disc before the writing operation is stopped is stored (S104).

Subsequently, the optical head 3 is made to access the start address ADR0 of the start address of the presently-reproduced program on the disc 1 (S105). Data is read out from the start address ADR0 on the disc 1 and is stored in the extra area EXT1 of the buffer RAM 13 (S106).

When an amount of data corresponding to 64 sectors from the start address of the program is read out and stored in the entire extra area EXT1 (S107), the address of the last sector stored in the extra area EXT1 (final address) is stored as ADR1 (S108).

Next, the optical head is made to access the start address ADR2 of the start of the program subsequent to the presently-reproduced program (S109). Data is read out from the start address ADR2 on the disc 1 and is stored in the extra area EXT2 of the buffer RAM 13 (S110).

When an amount of data corresponding to 64 sectors from the initial end of the program subsequent to the presently-reproduced program is read out and stored in the entire extra area EXT2 (S111), the address of the last stored in the extra area EXT2 (final address) is stored as ADR3 (S112).

The system controller 11 can detect the start addresses of the present program and the next program accessed in Steps S105 and 107 from TOC information read to the buffer RAM 13 from the disc 1.

The processing of Steps S105 to S108 and the processing of Steps S109 to S112 may be reversed in order.

Writing to the extra areas EXT1 and EXT2 is thus performed. Thereafter, the system controller 11 performs processing for turning off the power supply to the data writing and/or reading section 30 (S113).

After the processing of Step S104, the operation of reading from the buffer RAM 13 is continued (S202) even when the power supply to the data writing and/or reading section 30 is turned off in Step S113.

When the power supply to the data writing and/or reading section 30 is off, the system controller 11 monitors the amount N of accumulation in the audio data area NOR of the buffer RAM 13 (S115). When the system controller 11 determines that N<N₂ (see FIGS. 3C and 3D), it restarts the operation of the data writing and/or reading section 30, i.e., writing to the buffer RAM 13. That is, the process advances to Step S116 to supply power to the data writing and/or reading section 30 to start the components of the same, and the ordinary writing to the buffer RAM 13 in Step 103 is again started by making the optical head 3 access the address ADR(x+1) subsequent to the address ADRx at which the preceding writing from the disc is completed. That is, the operation for the time period from $t_2$ to $t_3$ shown in FIG. 3A is performed.

If an AMS access operation is started when the power supply to the data writing and/or reading section 30 is off in Step S113, the process of FIG. 6 moves from Step S114 to Step S118 while the process of FIG. 7 advances from Step S203 to Step S204.

To restart the operation of writing to the buffer RAM 13, processing for starting the data writing and/or reading section 30 is first started at step (S118). With respect to reading from the buffer RAM 13, determination is made as to whether the accessing direction corresponds to the FF or REW direction (S204) while the starting processing is performed on the data writing or reading section 30. In the case of the FF direction, reading data from the extra data EXT2 is started (S205). That is, the data read out from the initial end of the next program is immediately obtained as a reproduction output. If the accessing direction corresponds to the REW direction, reading data from the extra data EXT1 is started (S207). That is, the data read out from the initial end of the present program is immediately obtained as a reproduction output.

In the time period of about four seconds for reading from the extra area EXT1 or EXT2, the starting processing for turning on the various servos in the data writing and/or reading section 30 is completed and a determination is made as to whether the accessing direction corresponds to the FF or REW direction (S119). In the case of the FF direction, the sector subsequent to that having the address ADR3 stored in Step S112 is accessed (S120). The write pointer W is then reset (S122), and the process returns to Step S103 to start writing data from the sector subsequent to that having the address ADR3 from the first address of the audio data area NOR of the buffer RAM 13. That is, the ordinary storing is started from the sector subsequent to the final sector stored as data in the extra area EXT2.

If the accessing direction corresponds to the REW direction, the sector subsequent to that having the address ADR1 stored in Step S108 is accessed (S121). The write pointer W is then reset (S122), and the process returns to Step S103 to start writing data from the sector subsequent to that having the address ADR3 from the first address of the audio data area NOR of the buffer RAM 13. That is, the ordinary storing is started from the sector subsequent to the final sector stored as data in the extra area EXT1.

With respect to reading from the buffer RAM 13, if it is determined in Step S206 or S208 that reading from the extra area EXT2 or EXT1 has been completed, then the read pointer R is reset (S209) and the process returns to Step S202 to perform ordinary reading in accordance with the designation by the read pointer R. That is, the operation of reading data from the first address of the audio data area, in which data following the data stored in the extra area EXT2 or EXT1 is stored, is started.

The operation based on the processings shown in FIGS. 6 and 7 will be described with reference to FIG. 8 and FIGS. 5A to 5D.

For example, as shown at ①, data of program (n−1) to program n is read out from the disc 1, and is written to the audio data area NOR of the buffer RAM in accordance with the designation by the write pointer W.

It is assumed here that the amount N of accumulation of data in the audio data area NOR exceeds N₁, that is, data occupies the full capacity when the reproduction address ADRx is reached.

Then, as shown at ②, the optical head 3 is made to access the start address ADR0 of the program n and to read out data therefrom. The data read out is stored in the extra area EXT1 of the buffer RAM 13. After the data corresponding to 64 sectors to the extra area EXT1 has been stored, the optical head 3 is made to access the start address ADR2 of in the program (n+1) and to read out data therefrom, as shown at ③. The data read out is stored in the extra area EXT2 of the buffer RAM 13. After the completion of storing the data corresponding to 64 sectors to the extra area EXT2, the power supply to the data writing and/or reading section 30 is turned off for power saving.

During the power-off period, the amount N of data accumulation is monitored. If the amount N of data accumulation becomes smaller than $N_2$, the data writing and/or reading section 30 is restarted to again perform writing to the buffer RAM 13. As shown at 4, the sector (ADR (x+1)) having data following the data previously stored is accessed to restart writing to the audio data area NOR.

If a REW-AMS operation is started during the power-off period, the data writing and/or reading section 30 is started and data of the sectors subsequent to that having address ADR1 is then written to the audio data area NOR, as shown at 5.

If a FF-AMS operation is started during the power-off period, the data writing and/or reading section 30 is started and data of the sectors subsequent to that having address ADR3 is then written to the audio data area NOR, as shown at 6.

While the operation of the data writing and/or reading section 30 is performed in this manner, the operation of reading from the buffer RAM 13 is ordinarily performed according to the state of the read pointer R cyclically set with respect to the audio data area NOR, as shown in FIG. 5B, and a reproduction audio output is obtained by processing of the encoder and/or decoder section 14. Thus, during ordinary reproduction, successive audio data stored by the writing operation shown in FIG. 8 is reproduced.

On the other hand, if a REW-AMS operation is started during the period when the power supply to the data writing and/or reading section 30 is off, then the write pointer R is set to the top of the extra area EXT1 and reading from the extra area EXT1 is thereafter performed while the read pointer R is incremented, as shown in FIG. 5C. Audio data from addresses ADR0-ADR1, shown in FIG. 8, is thereby read out. When the entire data in the extra area EXT1 has been read out, the read pointer R is reset to the leading address of the audio data area NOR to start ordinary cyclic reading from the audio data area NOR. That is, audio data subsequent to that having address ADR1 is successively read out.

If FF-AMS operation is started during the period when the power supply to the data writing and/or reading section 30 is off, then the write pointer R is set to the top of the extra area EXT2 and reading from the extra area EXT2 is thereafter performed while the read pointer R is incremented, as shown in FIG. 5D. Audio data of addresses ADR2-ADR3, shown in FIG. 8, is thereby read out. When the entire data in the extra area EXT2 has been read out, the read pointer R is reset to the leading address of the audio data area NOR to start ordinary cyclic reading from the audio data area NOR. Audio data subsequent to that having address ADR3 is thereby read out successively.

By the above-described operation, the necessary audio output can be obtained immediately even after the start of AMS accessing made when power supply to the data writing and/or reading section 30 is off. Also, the audio output can be thereafter sustained without being interrupted.

The present invention is not limited to the above-described embodiment, and various modifications and changes of the invention are possible. For example, more extra areas may be provided to store data with an increased number of access points such that a program can be accessed by jumping one or more programs adjacent to the presently-read program.

Considering the possibility that the program having audio data presently reproduced may be changed during a waiting period, a method may be adopted in which three extra areas are provided to store the leading data of the present program, the leading data of the next program and the leading data of the next but one program at the start of a waiting period.

The above-described embodiment of the present invention is an example of an application of the invention to a recording and reproducing apparatus. However, the invention can also be applied to an apparatus for reproducing only. Further, the present invention can be applied to reproducing apparatuses adapted to use recording mediums other than the magneto-optical disc, e.g., an optical disc such as a compact disc, or a digital audio tape (DAT). That is, the present invention is applicable to apparatuses in which a buffer memory is provided after the data reading means to always maintain a certain amount of stored data while double-speed reading from the compact disc or the digital tape is being performed.

According to the present invention, as described above, a power-saving control means is provided which can perform an operation control for cutting the power consumption of a predetermined section or unit according to the capacity of the storage means during a time period when the operation of reading out data from the recording medium is not executed, thereby effectively reducing the power consumption and largely extending the left of the battery in the case of a battery drive.

Further, an extra area for storing predetermined amounts of data is prepared in the memory means. Therefore, the memory control means can store, in the extra area, data which is to be reproduced and output if an accessing operation is performed when the power-consumption-cutting control is being performed by the power-saving control means. Also, the memory control means can provide a reproduction output by reading out the data stored in the extra area if an accessing operation is performed when the power-consumption-cutting control is being performed. Therefore, it is possible to immediately obtain the necessary reproduction output even if an accessing operation is started by a user during the period when the operation for cutting the power consumption is performed. The accessing performance is not reduced by the power-consumption-cutting operation.

What is claimed is:

1. A reproducing apparatus comprising:
reproducing means for reproducing information recorded on a recording medium;
storage means having a primary storage area for temporarily storing a reproduction signal reproduced from the recording medium and at least one secondary storage area for storing reproduced portions of programs preceding or succeeding a last stored program;
first control means for controlling the storage means so that the reproduction signal reproduced by the reproducing means is written at a first rate to the primary storage area of the storage means and is read out from the primary storage area of the storage means at a second rate lower than the first rate;
power saving means for stopping an operation of at least one portion of the reproducing means relating to the operation of reproducing from the recording medium;
second control means for controlling the reproducing means so that writing of the reproduction signal to the primary storage area of the storage means is stopped when the amount of accumulation of the reproduced signal stored in primary storage area of the storage means becomes equal to or greater than a predetermined value; and third control means for performing movement control for moving the reproducing means to positions relative to the recording medium corresponding to one of a program last stored in the primary storage area of the storage means and other programs before and after the last stored program while writing of the reproduction signal to the primary storage area of the storage means is stopped, the third control means also controlling the first control means so that at least a part of the one of the programs preceding or succeeding the last stored program is reproduced after the movement control of the reproducing means, and so that the reproduction signal reproduced by the program reproduction is stored at the first rate in the secondary storage area of the storage means, the third control means also controlling the power saving means to depower a portion of the reproducing means after the part of the one of the programs preceding or succeeding the last stored program has been stored in the secondary storage area of the storage means.

2. An apparatus according to claim 1, wherein the power saving means stops the supply of electric power to the reproducing means.

3. An apparatus according to claim 1, wherein the power saving means stops a clock supplied to a circuit for decoding the reproduction signal from the reproducing means.

4. An apparatus according to claim 1, wherein the power saving means transmits a command to stop the operation of a system for driving the reproducing means.

5. An apparatus according to claim 1, wherein the power saving means reduces a servo gain of the reproducing means.

6. An apparatus according to claim 1, wherein, if an operation for accessing the one of the last stored program in the primary storage area of the storage means and the programs preceding and succeeding the last stored program is started while the operation of reproducing from the recording medium is stopped, then the part of the last stored program, the preceding program portion, or the succeeding program portion to be accessed, which part has been stored in the primary storage area or the secondary storage area of the storage means, is reproduced while depowered portions of the reproducing means are being repowered by the power saving means.

7. An apparatus according to claim 1, wherein the part of the program stored in the secondary area of the storage means has an amount of data not smaller than an amount whose readout time from the storage means corresponds to the time period necessary for repowering the depowered portions of the reproducing means.

8. An apparatus according to claim 1, wherein the part of the program stored in the secondary storage area of the storage means is an initial portion of the program if it is located before the last stored program in the storage means.

9. An apparatus according to claim 1, wherein the part of the program stored in the secondary storage area of the storage means is an initial portion of the program if it is located after the last stored program in the storage means.

10. A control method for a reproducing apparatus in which a reproduction signal reproduced from a recording medium is written at a first rate to storage means and is read out from the storage means at a second rate lower than the first rate, the method comprising the steps of:

stopping reproducing from the recording medium and initiating a depowering operation of at least one section of the reproducing apparatus relating to the operation of reproducing from the recording medium when the amount of accumulation of the reproduction signal in the storage means becomes equal to or greater than a predetermined value;

moving a reproducing head to a position relative to the recording medium corresponding to a point in one of a last stored program in the storage means and other programs before and after the last stored program at the initiation of the depowering operation;

thereafter, reproducing, by the reproducing head, at least a part of the program corresponding to the position to which the reproducing head has been moved, and writing a reproduced signal obtained by the reproducing step to the storage means to thereby store a portion of a program; and finally, stopping the operation of the section relating to the reproducing operation after the completion of the step of writing the reproduced signal to the storage means.

11. A method according to claim 10, wherein the step of stopping the operation of the section relating to the reproducing operation comprises stopping the supply of electric power to a portion of the reproducing apparatus.

12. A method according to claim 10, wherein the step of stopping the operation of the section relating to the reproducing operation comprises stopping a clock supplied to a circuit for decoding the reproduction signal from the reproducing head.

13. A method according to claim 10, wherein the step of stopping the operation of the section relating to the reproducing operation comprises transmitting a command to stop the operation of a system for driving the reproducing head.

14. A method according to claim 10, wherein the step of stopping the operation of the section relating to the reproducing operation comprises reducing a servo gain of a servo circuit of the reproducing apparatus.

15. A method according to claim 10, wherein the step of stopping the operation of the section relating to the reproducing operation includes a step in which, if an operation of accessing the one of the last stored program in the storage means or other programs before and after the last stored program is started, the part of the program to be accessed, which part has been stored in the storage means, is reproduced.

16. A method according to claim 10, wherein the part of the program stored in the storage means has an amount of data not smaller than an amount corresponding to the time period necessary for restarting a reproducing operation.

17. A reproducing apparatus comprising:
a reproducing head for reproducing information recorded on a recording medium;
a memory for temporarily storing a reproduction signal reproduced from the recording medium;
a first controller for controlling the memory so that the reproduction signal reproduced by the reproducing head is written at a first rate to the memory and is read out from the memory at a second rate lower than the first rate, and so that writing the reproduction signal to the memory is stopped when the amount of accumulation of the reproduction signal in the memory becomes equal to or greater than a predetermined value;
a second controller for power saving by stopping an operation of a circuit relating to the reproducing operation;
a third controller for performing movement control for moving the reproducing head to a position corresponding to one of a program in the reproduction signal stored in the memory and other programs before and after the reproduction signal while writing of the reproduction signal to the memory is stopped, the third controller also controlling the first controller so that at least a part of the program corresponding to the position to which the reproducing head has been moved is reproduced after the movement of the reproducing head, and so that the reproduction signal obtained by the program reproduction is stored at the first rate in the memory, the third controller also controlling the second controller to stop the circuit relating to the reproducing operation after the part of the program has been stored in the memory.

18. A reproducing apparatus comprising:

a reproducing head for reproducing information recorded on a recording medium;

a memory for temporarily storing a reproduction signal reproduced from the recording medium, the memory having a primary storage area and a first extra storage area and a second extra storage area;

a first controller for controlling the memory so that the reproduction signal reproduced by the reproducing head is written at a first rate to the memory and is read out from the memory at a second rate lower than the first rate, and so that writing the reproduction signal to the primary storage area of the memory is stopped when the amount of accumulation of the reproduction signal in the primary storage area of the memory becomes equal to or greater than a predetermined value;

a second controller for moving the reproducing head to a first position and a second position relative to the recording medium when writing to the primary storage area of the memory is stopped, reproducing a predetermined amount of the beginning of each program following the first position and the second position, and storing the reproduced predetermined amounts of the programs in the first and second extra storage areas, respectively, of the memory, wherein the first position corresponds to a beginning address of a last program being reproduced when writing to the primary storage area of the memory is stopped and the second position corresponds to a beginning address of a program subsequent to the last program;

a third controller for power saving by stopping an operation of a circuit relating to the reproducing operation after the predetermined portions of the beginnings of the last program and the program subsequent to the last program have been stored in the memory; and fast forward and fast reverse searching control means for:
causing the third controller to restart power to the circuit relating to the reproducing operation;
selectively controlling the reproducing head to move to a first position relative to the recording medium which corresponds to an end address of the beginning of the last program stored in the first extra storage area and begin reproduction of the signal recorded at that position on the recording medium or move to a second position relative to the recording medium which corresponds to an end address of the beginning of the program subsequent to the last program stored in the second extra storage area and begin reproduction of the signal recorded at that position on the recording medium; and
causing the first controller to read out and reproduce the program stored in the first extra storage area of the memory while the reproducing head is moved by the fast forward and fast reverse searching means to the first position or reproduce the program stored in the second extra storage area of the memory while the reproducing head is caused to move by the fast forward and fast reverse searching means to the second position.

* * * * *